(12) United States Patent
Mi et al.

(10) Patent No.: US 10,239,302 B2
(45) Date of Patent: *Mar. 26, 2019

(54) LAYER-BY-LAYER ASSEMBLY OF GRAPHENE OXIDE MEMBRANES VIA ELECTROSTATIC INTERACTION AND ELUDICATION OF WATER AND SOLUTE TRANSPORT MECHANISMS

(71) Applicant: University of Maryland, College Park, MD (US)

(72) Inventors: Baoxia Mi, Moraga, CA (US); Meng Hu, Baltimore, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,219

(22) Filed: Feb. 26, 2018

(65) Prior Publication Data
US 2018/0186142 A1    Jul. 5, 2018

Related U.S. Application Data

(62) Division of application No. 14/658,990, filed on Mar. 16, 2015, now Pat. No. 9,902,141.
(Continued)

(51) Int. Cl.
*B32B 37/14* (2006.01)
*B01D 69/10* (2006.01)
(Continued)

(52) U.S. Cl.
CPC ............ *B32B 37/14* (2013.01); *B01D 69/10* (2013.01); *B01D 69/12* (2013.01); *B01D 71/021* (2013.01);
(Continued)

(58) Field of Classification Search
CPC ................. C01B 31/043; B32B 37/14; B32B 2038/0076; B32B 2310/025;
(Continued)

(56) References Cited

U.S. PATENT DOCUMENTS 9,902,141 B2* 2/2018 Mi ......................... B32B 37/14
2014/0242496 A1* 8/2014 Ryu ......................... B32B 9/04
429/517

(Continued)

OTHER PUBLICATIONS

Wansuk Choi; "Layer-by-Layer assembly of graphene oxide nanosheets on polyamide membranes for Durable reverse-osmosis applications", Nov. 12, 2013.*

(Continued)

*Primary Examiner* — Vishal I Patel
(74) *Attorney, Agent, or Firm* — Carter, DeLuca & Farrell, LLP; George Likourezos

(57) ABSTRACT

A method for synthesizing a water purification membrane is presented. The method includes stacking a plurality of graphene oxide (GO) nanosheets to create the water purification membrane, the stacking involving layer-by-layer assembly of the plurality of GO nanosheets and forming a plurality of nanochannels between the plurality of GO nanosheets for allowing the flow of a fluid and for rejecting the flow of contaminants. The method further includes cross-linking the plurality of GO nanosheets by 1,3,5-benzenetricarbonyl trichloride on a polydopamine coated polysulfone support.

15 Claims, 15 Drawing Sheets

Related U.S. Application Data

(60) Provisional application No. 61/953,418, filed on Mar. 14, 2014.

(51) Int. Cl.

| | | |
|---|---|---|
| B01D 69/12 | (2006.01) | |
| B01D 71/02 | (2006.01) | |
| C01B 32/198 | (2017.01) | |
| C01B 32/23 | (2017.01) | |
| B32B 38/00 | (2006.01) | |
| B01D 61/00 | (2006.01) | |
| B01D 61/02 | (2006.01) | |
| B01D 65/08 | (2006.01) | |
| B01D 67/00 | (2006.01) | |
| B01D 69/14 | (2006.01) | |
| B01D 71/60 | (2006.01) | |
| B01D 71/68 | (2006.01) | |

(52) U.S. Cl.
CPC ............ *C01B 32/198* (2017.08); *C01B 32/23* (2017.08); *B01D 61/002* (2013.01); *B01D 61/025* (2013.01); *B01D 65/08* (2013.01); *B01D 67/0006* (2013.01); *B01D 69/148* (2013.01); *B01D 71/60* (2013.01); *B01D 71/68* (2013.01); *B01D 2323/30* (2013.01); *B01D 2325/14* (2013.01); *B32B 2038/0076* (2013.01); *B32B 2310/025* (2013.01); *Y10T 156/10* (2015.01)

(58) Field of Classification Search
CPC .............. B01D 2323/30; B01D 61/002; B01D 61/025; B01D 65/08; B01D 67/0006; B01D 69/10; B01D 69/12; B01D 69/148; B01D 71/021; B01D 71/60; B01D 71/68; B01D 2325/14; Y10T 156/10

See application file for complete search history.

(56) References Cited

U.S. PATENT DOCUMENTS

| | | |
|---|---|---|
| 2014/0311967 A1 | 10/2014 | Grossman |
| 2014/0374267 A1 | 12/2014 | Monteiro |

OTHER PUBLICATIONS

Francois Perreault; "Thin-Film composite polyamide membranes fuctionalized with biocidal graphene oxide nanosheets", Dec. 6, 2013.*

Baoxia Mi "Graphene Oxide Membranes for Ionic and Molecular Sieving" Published Feb. 14, 2014.

Dreyer, D. R.; Park, S.; Bielawski, C. W.; Ruoff, R. S., The chemistry of graphene oxide. Chem Soc Rev 2010, 39, (1), 228-240.

Cohen-Tanugi, D.; Grossman, J. C., Water desalination across nanoporous graphene. Nano Letters 2012, 12, (7), 3602-3608.

Hu, M.; Mi, B., Enabling graphene oxide nanosheets as water separation membranes. Environmental Science & Technology 2013, 47, (8), 3715-3723.

Nair, R. R.; Wu, H. A.; Jayaram, P. N.; Grigorieva, I. V.; Geim, A. K., Unimpeded permeation of water through helium-leak-tight graphene-based membranes. Science 2012, 335, (6067), 442-444.

Dikin, D. A.; Stankovich, S.; Zimney, E. J.; Piner, R. D.; Dommett, G. H. B.; Evmenenko, G.; Nguyen, S. T.; Ruoff, R. S., Preparation and characterization of graphene oxide paper. Nature 2007, 448, (7152), 457-460.

Qiu, L; Zhang, X. H.; Yang, W. R.; Wang, Y. F.; Simon, G. P.; Li, D., Controllable corrugation of chemically converted graphene sheets in water and potential application for nanofiltration. Chem Commun 2011, 47, (20), 5810-5812.

Kannam, S. K.; Todd, B. D.; Hansen, J. S.; Daivis, P. J., Interfacial slip friction at a fluid-solid cylindrical boundary. The Journal ofChemical Physics 2012, 136, (24), 244704.

Han, Y.; Xu, Z.; Gao, C., Ultrathin graphene nanofiltration membrane for water purification. Advanced Functional Materials 2013, doi: 10.1002/adfm.201202601.

Huang, H.; Song, Z.; Wei, N.; Shi, L.; Mao, Y.; Ying, Y.; Sun, L.; Xu, Z.; Peng, X., Ultrafast viscous water flow through nanostrand-channelled graphene oxide membranes. Nat Commun 2013, 4.

Li, D.; Mueller, M. B.; Gilje, S.; Kaner, R. B.; Wallace, G. G., Processable aqueous dispersions of graphene nanosheets. Nature nanotechnology 2008, 3, (2), 101-105.

Szabo, T.; Berkesi, 0.; Forgo, P.; Josepovits, K.; Sanakis, Y.; Petridis, D.; Dekany, I., Evolution of surface functional groups in a series of progressively oxidized graphite oxides. ChemistryofMaterials 2006,18, (11), 2740-2749.

Kotov, N. A.; Dekany, I.; Fendler, J. H., Ultrathin graphite oxide-polyelectrolyte composites prepared by self-assembly: Transition between conductive and non-conductive states. Advanced Materials 1996, 8, (8), 637-641.

Kovtyukhova, N. I.; Ollivier, P. J.; Martin, B. R.; Mallouk, T. E.; Chizhik, S. A.; Buzaneva, E. V.; Gorchinskiy, A. D., Layer-by-layer assembly of ultrathin composite films from micron-sized graphite oxide sheets and polycations. Chemistry ofMaterials 1999, 11, (3), 771-778.

Decher, G., Fuzzy nanoassemblies—toward layered polymeric multicomposites. Science 1997, 277, 1232-1237.

Hammond, P. T., Recent explorations in electrostatic multilayer thin film assembly. Current Opinion in Colloid & Inteiface Science 1999, 4, (6), 430-442.

Krasemann, L.; Toutianoush, A.; Tieke, B., Self-assembled polyelectrolyte multilayer membranes with highly improved pervaporation separation of ethanol/water mixtures. Journal of Membrane Science 2001, 181, (2), 221-228.

Zhang, G.; Yan, H.; Ji, S.; Liu, Z., Self-assembly of polyelectrolyte multilayer pervaporation membranes by a dynamic layer-by-layer technique on a hydrolyzed polyacrylonitrile ultrafiltration membrane. Journal of Membrane Science 2007,292, (1-2),1-8.

Jin, W.; Toutianoush, A.; Tieke, B., Use of polyelectrolyte layer-by-layer assemblies as nanofiltration and reverse osmosis membranes. Langmuir 2003, 19, (7), 2550-2553.

Liu, S. Z.; Sun, H. Q.; Liu, S.M.; Wang, S. B., Graphene facilitated visible light photodegradation of methylene blue over titanium dioxide photocatalysts. Chern Eng J2013, 214, 298-303.

Malaisamy, R.; Bruening, M. L., High-flux nanofiltration membranes prepared by adsorption of multilayer polyelectrolyte membranes on polymeric supports.Pdf. Langmuir 2005, 21, 10587-10592.

Ouyang, L.; Malaisamy, R.; Bruening, M. L., Multilayer polyelectrolyte films as nanofiltration membranes for separating monovalent and divalent cations. Journal of Membrane Science 2008,310, (1-2), 76-84.

Stanton, B. W.; Harris, J. J.; Miller, M.D.; Bruening, M. L., Ultrathin, multilayered polyelectrolyte films as nanofiltration membranes. Langmuir 2003, 19, (17), 7038-7042.

Zhou, Y.; Yu, S.; Gao, C.; Feng, X., Surface modification of thin film composite polyamide membranes by electrostatic self deposition of polycations for improved fouling resistance. Separation and Purification Technology 2009, 66, (2), 287-294.

Qiu, C.; Qi, S.; Tang, C. Y., Synthesis of high flux forward osmosis membranes by chemically crosslinked layer-by-layer polyelectrolytes. Journal of Membrane Science 2011, 381, (1-2), 74-80.

Saren, Q.; Qiu, C. Q.; Tang, C. Y., Synthesis and characterization of novel forward osmosis membranes based on layer-by-layer assembly. Environmental Science & Technology 2011, 45, (12), 5201-5208.

Cath, T. Y.; Childress, A. E.; Elimelech, M., Forward osmosis: Principles, applications, and recent developments. Journal of Membrane Science 2006, 281, (1-2), 70-87.

Chung, T.-S.; Li, X.; Ong, R. C.; Ge, Q.; Wang, H.; Han, G., Emerging forward osmosis (fo) technologies and challenges ahead for clean water and clean energy applications. Current Opinion in Chemical Engineering 2012,1, (3), 246-257.

(56) References Cited

OTHER PUBLICATIONS

Zhao S.; Zou, L.; Tang, C. Y.; Mulcahy, D., Recent developments in forward osmosis: Opportunities and challenges. Journal of Membrane Science 2012, 396, (0), 1-21.
McGinnis, R. L.; Elimelech, M., Global challenges in energy and water supply: The promise of engineered osmosis. Environmental Science & Technology 2008, 42, (23), 8625-8629.
Yip, N. Y.; Tiraferri, A.; Phillip, W. A.; Schiffman, J. D.; Hoover, L.A.; Kim, Y. C.; Elimelech, M., Thin-film composite pressure retarded osmosis membranes for sustainable power generation from salinity gradients. Environmental Science &Technology 2011, 45, (10), 4360-4369.
Wang, R.; Shi, L; Tang, C. Y.; Chou, S.; Qiu, C.; Fane, A. G., Characterization of novel forward osmosis hollow fiber membranes. Journal of Membrane Science 2010, 355, (1), 158-167.
Mi, B. X.; Elimelech, M., Organic fouling of forward osmosis membranes: Fouling reversibility and cleaning without chemical reagents. Journal of Membrane Science 2010, 348, (1-2), 337-345.
Tiraferri, A.; Yip, N.Y.; Phillip, W. A.; Schiffman, J.D.; Elimelech, M., Relating performance of thin-film composite forward osmosis membranes to support layer formation and structure. Journal of Membrane Science 2011,367, (1-2), 340-352.
Hummers, W. S.; Offeman, R. E., Preparation of graphitic oxide. Journal of the American Chemical Society 1958, 80, (6), 1339-1339.
Marcano, D. C.; Kosynkin, D. V.; Berlin, J. M.; Sinitskii, A.; Sun, Z.; Slesarev, A.; Alemany, L. B.; Lu, W.; Tour, J. M., Improved synthesis of graphene oxide. ACS Nano 2010, 4, (8), 4806-4814.
Perry, L.A.; Coronell, 0., Reliable, bench-top measurements of charge density in the active layers of thin-film composite and nanocomposite membranes using quartz crystal microbalance technology. Journal of Membrane Science 2013, 429, (0), 23-33.
Decher, G.; Schmitt, J., Fine-tuning of the film thickness of ultrathin multilayer films composed of consecutively alternating layers of anionic and cationic polyelectrolytes. In Trends in colloid and interface science vi, Springer: 1992; pp. 160-164.
Shiratori, S. S.; Rubner, M. F., Ph-dependent thickness behavior of sequentially adsorbed layers of weak polyelectrolytes. Macromolecules 2000, 33, (11), 4213-4219.
Zangmeister, C. D.; Ma, X.; Zachariah, M. R., Restructuring of graphene oxide sheets into monodisperse nanospheres. Chemistry of Materials 2012, 24, (13), 2554-2557.
Yip, N.Y.; Tiraferri, A.; Phillip, W. A.; Schiffman, J. D.; Elimelech, M., High performance thin-film composite forward osmosis membrane. Environmental Science & Technology 2010, 44, (10), 3812-3818.
Dubas, S. T.; Schlenoff, J. B., Polyelectrolyte multilayers containing a weak polyacid: Construction and deconstruction. Macromolecules 2001, 34, (11), 3736-3740.
Buffle, J.; Zhang, Z.; Startchev, K., Metal flux and dynamic speciation at (bio )interfaces. Part i: Critical evaluation and compilation of physicochemical parameters for complexes with simple ligands and fulvic/humic substances. EnvironmentalScience & Technology 2007,41, (22), 7609-7620.
Miller, D. G.; Rard, J. A.; Eppstein, L. B.; Albright, J. G., Mutual diffusion coefficients and ionic transport coefficients lij of magnesium chloride-water at 25.Degree.C. The Journal of Physical Chemistry 1984, 88, (23), 5739-5748.
Mi, Graphene Oxide Membranes for Ionic and Molecular Sieving, Materials Science, Science, vol. 343, pp. 740-742 (Feb. 2014).
Hu et al., Graphene Oxide Membranes: Layer-by-layer Assembly via Electrostatis Interaction and Elucidation of Water and Solute Transport Mechanisms, Environmental Science & Technology, Univ. of Maryland, pp. 1-26 (2014).

* cited by examiner

LAYER-BY-LAYER ASSEMBLY OF GRAPHENE OXIDE MEMBRANES VIA ELECTROSTATIC INTERACTION AND ELUDICATION OF WATER AND SOLUTE TRANSPORT MECHANISMS

CROSS REFERENCE TO RELATED APPLICATION

This application is a divisional of, and claims the benefit of and priority to, U.S. patent application Ser. No. 14/658,990 filed Mar. 16, 2015, entitled "Layer-by-Layer Assembly of Graphene Oxide Membranes Via Electrostatic Interaction and Elucidation of Water and Solute Transport Mechanisms", by Mi Baoxia et al., now U.S. Pat. No. 9,902,141, which claims the benefit of and priority to U.S. Provisional Patent Application Ser. No. 61/953,418 filed Mar. 14, 2014, entitled "Layer-by-Layer Assembly of Graphene Oxide Membranes for Separation" by Mi Baoxia et al., the entire contents of each of which are incorporated herein by reference.

GOVERNMENT SUPPORT

This invention was made with U.S. government support under CBET1158601 and CBET11544572 awarded by the National Science Foundation (NSF). The U.S. government has certain rights in this invention.

BACKGROUND

Technical Field

The present disclosure relates to water treatment processes using nanomaterials in membrane synthesis and surface modification. More particularly, the present disclosure relates to systems and methods for using a layer-by-layer (LbL) assembly of graphene oxide (GO) nanosheets via bonding techniques, such as covalent bonding and electrostatic interaction.

Description of Related Art

Dwindling water resources and increasing water consumption have forced researchers to consider new advanced water treatment technologies that can provide a safe water supply in a more efficient, environmentally sustainable manner. Nanofiltration (NF), reverse osmosis (RO), and forward osmosis (FO) membrane processes are among the most effective strategies to achieve high removal of both traditional and emerging contaminants from water. All these processes require the use of semi-permeable membranes, the market of which has been dominated for decades by thin film composite (TFC) polyamide membranes due to their salient advantages, such as good separation capability and wide pH tolerance. Despite their advantages, TFC membranes face technical limitations regarding, for example, chlorine resistance, fouling resistance, and energy efficiency. It is also a challenge to make TFC membranes with thinner, more hydrophilic and more porous support layers, which are crucial for high-performance membranes.

The recently emerging graphene-based nanomaterials have exhibited interesting properties, such as adsorption of metal and organic dyes, antimicrobial capability, and photocatalytic degradation of organic molecules. In particular, graphene oxide (GO) nanosheets offer an extraordinary potential for making functional nanocomposite materials with high chemical stability, strong hydrophilicity, and excellent antifouling properties. In recent years, nanomaterials have been extensively used in membrane synthesis and surface modification to improve membrane performance (e.g., flux, antibacterial property, fouling resistance, photocatalytic property) or to optimize the operation of membrane processes (e.g., energy consumption, maintenance requirement). Because the use of these nanomaterials often relies on expensive materials, costly facilities, and highly complex synthesis, it becomes very desirable to make high-performance water separation membranes using low-cost raw materials and facile yet scalable synthesis methods.

As a derivative of graphene, GO nanosheets can be mass-produced via chemical oxidization and ultrasonic exfoliation of graphite. Hence, GO nanosheets bear hydroxyl, carboxyl, and epoxide functional groups on the plane of carbon atoms and thus have a more polar, hydrophilic character. A GO nanosheet is single-atom-thick with lateral dimensions as high as tens of micrometers, making it highly stackable. Stacked GO nanosheets made via a simple solution filtration method can exhibit excellent mechanical strength in dry conditions.

The concept of using graphene-based nanomaterials to make water separation membranes was first examined using molecular simulations. Nanopores are "punched" through a super-strong graphene monolayer so that water can permeate through the single-atom-thick membrane while other substances are selectively rejected. By controlling pore sizes and functional groups on graphene, such a monolayer graphene membrane could be useful for desalination, with a water permeability of several magnitudes higher than that of current reverse osmosis (RO) membranes. An experimental study was recently reported to create such porous graphene membranes and test their selectivity for gas separation. Despite these simulation and experimental efforts, at present significant technical difficulties exist in making such monolayer graphene membrane for real-world water separation. For example, it is still impractical to prepare a large area of monolayer graphene, and it is extremely challenging to obtain high-density nanopores with controllable, relatively uniform sizes on a graphene sheet.

An alternative approach is to synthesize a water separation membrane with stacked GO nanosheets. The spacing between the neighboring GO nanosheets creates 2D nanochannels that may allow water to pass through while rejecting unwanted solutes. Water can flow at an extremely high speed in such planar graphene nanochannels. A recent experimental study has revealed unimpeded permeation of water vapor (at a rate $10^{10}$ times faster than helium) through a stacked GO membrane, a phenomenon that could be attributed to a nearly frictionless flow of a monolayer of water through 2D capillaries formed by closely spaced GO nanosheets. Although tested for gas/vapor separation only, stacked GO nanosheets hold great potential for making highly permeable water separation membranes to remove various types of contaminants.

Stacked GO membranes reported so far in the literature, however, are made simply via solution filtration. Hence, they are not suitable for water separation applications due to the lack of necessary bonding between stacked GO nanosheets. This is because GO nanosheets are extremely hydrophilic and thus these membranes tend to easily disperse in water. Even if some performance data could be collected through extremely careful handling of the membrane made with unbonded GO nanosheets, such a GO membrane unfortunately does not survive the cross-flow testing conditions, which are typical in real-world membrane operation. Therefore, these unbonded GO membranes should not be considered or used as water separation membranes.

After a GO membrane has been synthesized, the oxygen-containing functional groups on GO provide convenient sites for further functionalization to adjust various properties (e.g., charges, interlayer spacing, specific interactions with water contaminants) of GO nanosheets. For example, GO can be covalently functionalized by amine groups to modify charges, sulfonic groups to make ion/proton-exchange membranes, and polymers to enhance biocompatibility. GO can also be non-covalently bonded with various monomers, polymers, and even nanoparticles to adjust mechanical, thermal, and chemical properties. These exceptional properties of GO provide for flexibility to optimize not only membrane permeability by varying the size and morphology of the functional groups (thus adjusting GO interlayer spacing) but also membrane selectivity by adjusting charge, charge density, and specific interactions with water contaminants.

To date, however, synthesis of a water separation membrane by the proper bonding and optimization of stacked GO nanosheets has not been reported.

SUMMARY

Embodiments of the present disclosure are described in detail with reference to the drawing figures wherein like reference numerals identify similar or identical elements.

An aspect of the present disclosure provides a method for synthesizing a water purification membrane, the method including stacking a plurality of graphene oxide (GO) nanosheets to create the water purification membrane, the stacking involving layer-by-layer assembly of the plurality of GO nanosheets and forming a plurality of nanochannels between the plurality of GO nanosheets for allowing the flow of a fluid and for rejecting the flow of contaminants.

In one aspect, the method further includes cross-linking the plurality of GO nanosheets by 1,3,5-benzenetricarbonyl trichloride on a polysulfone support.

In another aspect, the polysulfone support is a polydopamine coated polysulfone support.

In yet another aspect, the plurality of GO nanosheets are negatively charged over a wide pH range.

In one aspect, the method further includes covalently bonding the plurality of GO nanosheets via cross-linkers. The cross-linkers may be monomers and polymers.

In another aspect, the method includes electrostatically bonding the plurality of GO nanosheets. A structure, a charge, and a functionality of the plurality of GO nanosheets may be tuned by using polyelectrolytes.

In yet another aspect, the lateral sizes of the plurality of GO nanosheets vary between 100 and 5000 nm, whereas a thickness of the plurality of GO nanosheets varies between 1 and 2 nm.

In another aspect, the stacking results in at least a portion of the plurality of GO nanosheets being arranged in a non-overlapping manner.

Another aspect of the present disclosure provides a method for creating a water separation membrane, the method including depositing a plurality of graphene oxide (GO) nanosheets via a layer-by-layer assembly and bonding the plurality of GO nanosheets with each other and with a support substrate.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

BRIEF DESCRIPTION OF THE DRAWINGS

Various embodiments of the present disclosure are described herein below with references to the drawings, wherein.

Figure 1:
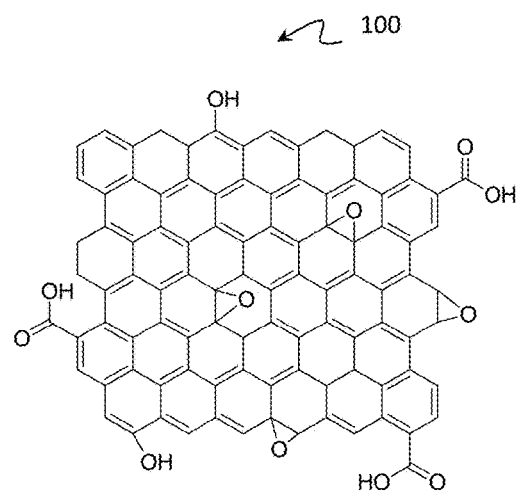
FIG. 1 illustrates the chemical composition of graphene oxide (GO), in accordance with embodiments of the present disclosure.

The figures depict embodiments of the present disclosure for purposes of illustration only. One skilled in the art will readily recognize from the following disclosure that alternative embodiments of the structures and methods illustrated herein may be employed without departing from the principles of the present disclosure described herein.

DETAILED DESCRIPTION

Although the present disclosure will be described in terms of specific embodiments, it will be readily apparent to those skilled in this art that various modifications, rearrangements and substitutions may be made without departing from the spirit of the present disclosure. The scope of the present disclosure is defined by the claims appended hereto.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The exemplary embodiments of the present disclosure present a novel type of water purification membrane that was synthesized by layer-by-layer (LbL) assembly of negatively charged graphene oxide (GO) nanosheets on both sides of a porous poly(acrylonitrile) support and interconnected by positively charged poly(allylamine hydrochloride) (PAH) via, for example, electrostatic interaction. Transport of water and selected solutes in the GO membrane was investigated in a pressurized system and also in a forward osmosis (FO) and pressure retarded osmosis system, as described in detail below.

Water permeability of the GO membrane was found to be about one order of magnitude higher than that of a commercial FO membrane, corresponding to water flowing in the GO channel at a speed of two orders of magnitude higher than that predicted by the Poiseuille equation. The dominant path for water and solute transport was most likely formed by the clear space (~1 nm) between layered GO nanosheets. Although the GO membrane might hydrate in solutions of high ionic strength, it retained a tight structure and exhibited high rejection and slow diffusion of solutes in solutions of low ionic strength. Hence, the GO membrane at the current stage can be well suited for applications such as FO-based emergency water supply systems using sugary draw solutions and water treatment not requiring high ionic strength.

FIG. 1 illustrates the chemical composition 100 of graphene oxide, in accordance with embodiments of the present disclosure.

The present disclosure presents an approach for the synthesis and surface modification of water separation membranes by layer-by-layer (LbL) assembly of graphene oxide (GO) nanosheets. The GO membranes have high water permeability and improved selectivity for targeted contaminants, thereby representing an alternative to current water separation membranes.

Figure 2:
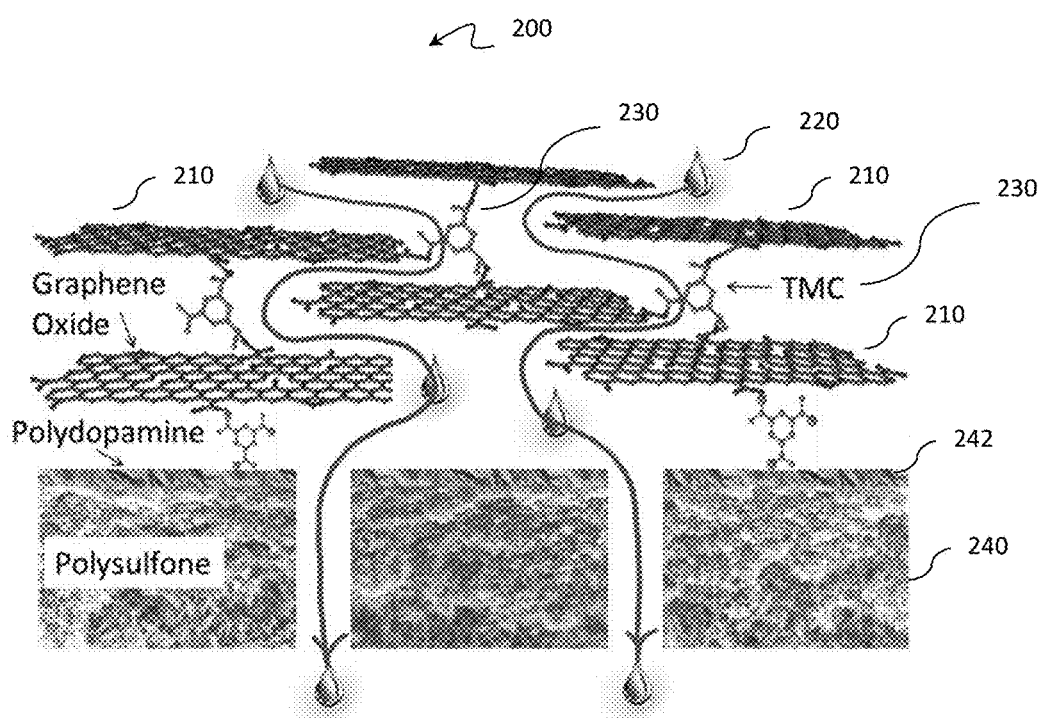
FIG. 2 illustrates a layer-by-layer (LbL) assembly of GO nanosheets, in accordance with embodiments of the present disclosure.

FIG. 2 illustrates a layer-by-layer assembly 200 of graphene oxide nanosheets, in accordance with embodiments of the present disclosure.

A procedure is presented to synthesize a water separation membrane using GO nanosheets 210 such that water 220 can flow through the nanochannels between GO layers 210 while unwanted solutes 230 are rejected by size exclusion and charge effects, as illustrated in FIG. 2. The GO membrane is made by a LbL deposition of GO nanosheets 210, which are cross-linked by 1,3,5-benzenetricarbonyl trichloride on a polysulfone support 240 having a polydopamine layer 242. The cross-links provide the stacked GO nanosheets 210 with the necessary stability to overcome their inherent dispensability in a water environment and also fine-tune the charges, functionality, and spacing of the GO nanosheets 210.

The membranes were synthesized with different numbers of GO layers to demonstrate their water separation performance. GO membrane flux ranged between 80 and 276 LMH/MPa, roughly 4-10 times higher than that of most commercial nano-filtration membranes. Although the GO membrane in the present development stage had a relatively low rejection (6-46%) of monovalent and divalent ions, it exhibited a moderate rejection (46-66%) of Methylene blue and a high rejection (93-95%) of Rhodamine-WT.

Thus, it was demonstrated that selective and permeable GO membranes can be synthesized via an LbL coating approach. The GO membrane exhibited a number of advantages over existing membranes. First, the GO membrane uses graphite as an inexpensive raw material, significantly lowering the membrane fabrication cost. Second, the synthesis procedure for both GO nanosheets and GO membrane is simple and scalable, thus providing technical readiness for scaling up the membrane production. In the present stage, the synthesized GO membrane had very high rejection of an organic dye with a molecular weight of around 500 Daltons. Water flux of the GO membrane was about 4-10 times higher than that of most currently commercially available NF membranes. The facile synthesis of a GO membrane exploiting the ideal properties of inexpensive GO materials offers a myriad of opportunities to modify its physicochemical properties, potentially making the GO membrane a next-generation, cost-effective, and sustainable alternative to the long-existing thin-film composite polyamide membranes for water separation applications.

Figure 3A:
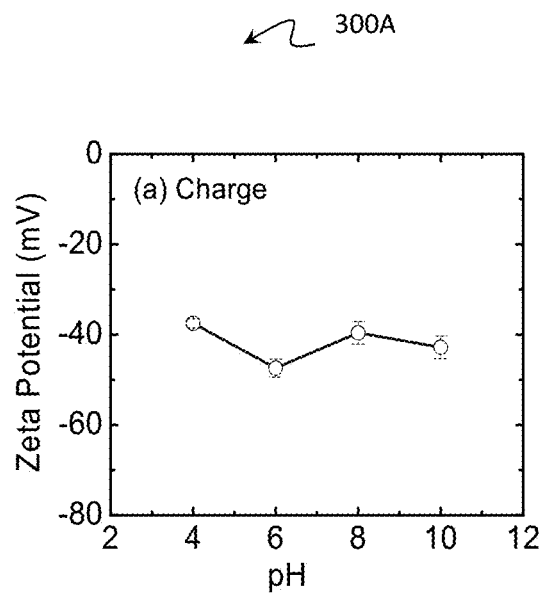
FIG. 3A illustrates a graph of a zeta potential measurement of the GO nanosheets of FIG. 2, in accordance with embodiments of the present disclosure.
Figure 3B:
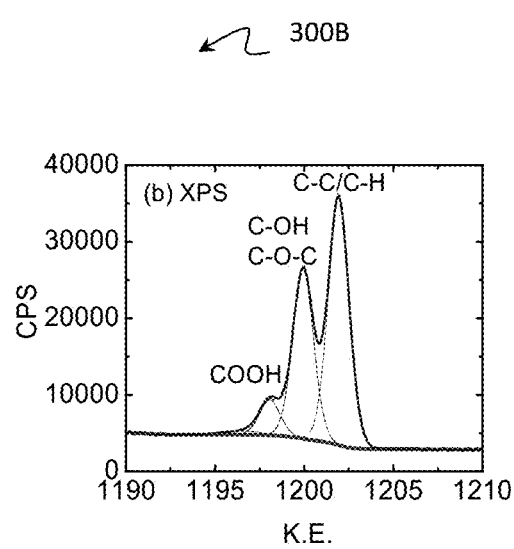
FIG. 3B illustrates a graph of X-ray photoelectron spectroscopy (XPS) data related to the GO nanosheets of FIG. 2, in accordance with embodiments of the present disclosure.

FIG. 3A illustrates a graph 300A of a zeta potential measurement of the GO nanosheets, in accordance with embodiments of the present disclosure, whereas FIG. 3B illustrates a graph 300B of X-ray photoelectron spectroscopy (XPS) data related to the GO nanosheets, in accordance with embodiments of the present disclosure.

Figure 3C:
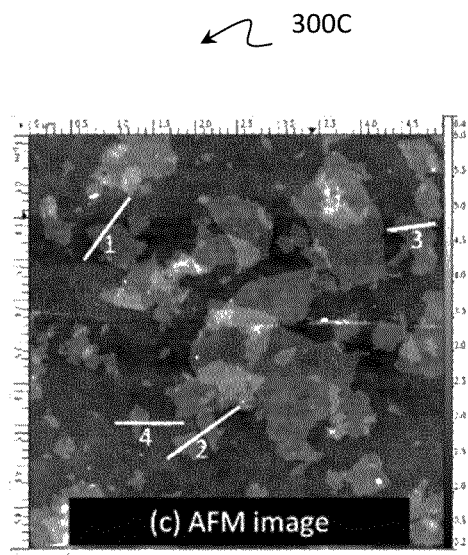
FIG. 3C illustrates an atomic force microscopy (AFM) image of the GO nanosheets of FIG. 2, in accordance with embodiments of the present disclosure.
Figure 3D:
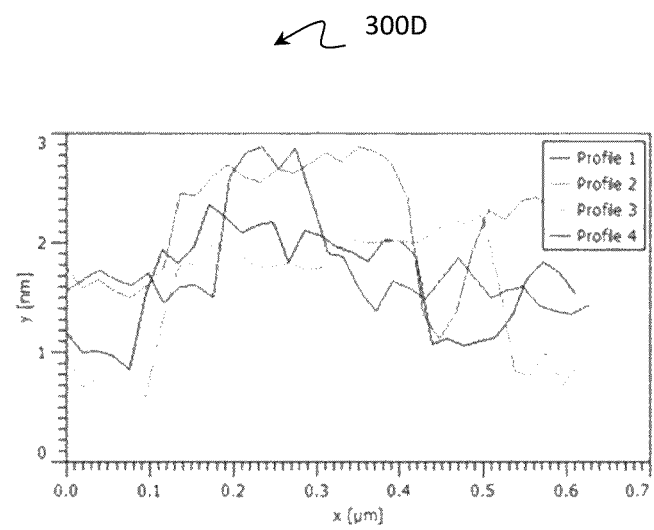
FIG. 3D illustrates a graph of AFM height profiles of the GO nanosheets of FIG. 2, in accordance with embodiments of the present disclosure.

FIG. 3C illustrates an atomic force microscopy (AFM) image 300C of the GO nanosheets, in accordance with embodiments of the present disclosure, whereas FIG. 3D illustrates a graph 300D of AFM height profiles of the GO nanosheets, in accordance with embodiments of the present disclosure.

Concerning the synthesis of GO nanosheets, GO nanosheets were prepared from graphite using a modified Hummers method. Flake graphite was oxidized in a mixture of $KMnO_4$, $H_2SO_4$, and $NaNO_3$, then the resulting pasty GO was diluted and washed through cycles of filtration, centrifugation, and resuspension. The washed GO suspension was subsequently ultrasonicated to exfoliate GO particles into GO nanosheets and centrifuged at high speed to remove unexfoliated graphite residues. The resulting yellowish/light brown solution was the final GO nanosheet suspension. This color indicated that the carbon lattice structure was distorted by the added oxygenated functional groups. The produced GO nanosheets were very hydrophilic and stayed suspended in water for months without a sign of aggregation or deposition.

Concerning the characterization of GO nanosheets, a series of characterization experiments were performed to understand the unique shape, functionality, and other physicochemical properties of GO nanosheets. These experiments included calculations related to zeta-potential analyzer for charge, Raman spectroscopy for G/D ratio, Fourier transform infrared spectroscopy (FTIR) and X-ray photoelectron spectroscopy (XPS) for functional groups, X-ray diffraction (XRD) for crystalline structure, and atomic force microscopy (AFM), SEM, and transmission electron microscopy (TEM) for size and shape, as discussed below with reference to FIGS. 3A-3D.

During these experiments, the zeta potential measurement (see FIG. 3A) revealed that the GO nanosheets were negatively charged over a wide pH range. The XPS data (see FIG. 3B) showed that about 60% of carbon was not oxidized, 32% had C—O bond (representing hydroxyl and epoxide groups), and 7% had —COOH bond. Moreover, it is evident from the AFM image (see FIG. 3C) that the lateral sizes of GO nanosheets varied between 100 and 5000 nm. The depth profiles (see FIG. 3D) obtained by analysis of the AFM image demonstrated that the heights of the GO nanosheets were in the range of 1-2 nm, indicating that the GO nanosheets contained either single or double layers of carbon lattice. These characterization techniques were used to study the effects of experimental conditions (e.g., oxidation time, sonication strength and duration) on the properties of GO nanosheets.

Figures 4A, 4B:
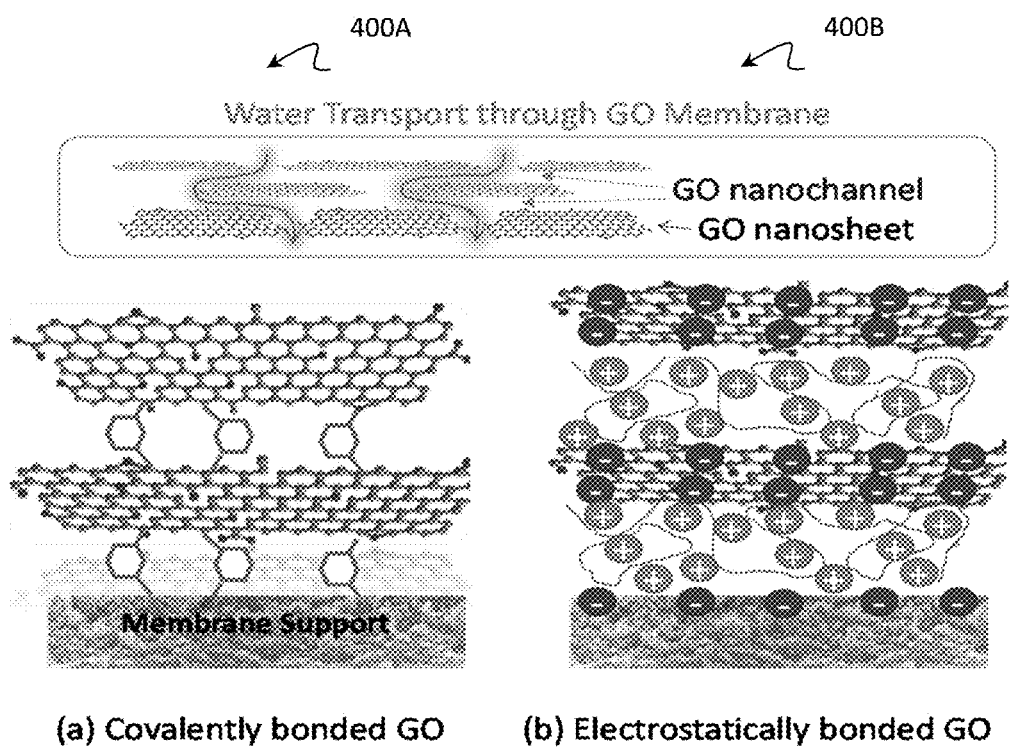
FIG. 4A illustrates a LbL assembly of a covalently bonded GO synthesis strategy, in accordance with embodiments of the present disclosure.
FIG. 4B illustrates a LbL assembly of an electrostatically bonded GO synthesis strategy, in accordance with embodiments of the present disclosure.

FIG. 4A illustrates a covalently bonded GO synthesis strategy 400A, in accordance with embodiments of the present disclosure, whereas FIG. 4B illustrates an electrostatically bonded GO synthesis strategy 400B, in accordance with embodiments of the present disclosure.

Concerning membrane synthesis strategies, two readily scalable LbL synthesis strategies are proposed to create GO membranes with a variety of properties. As shown in FIG. 4A, the first strategy is to use cross-linkers to covalently bond the stacked GO nanosheets. The covalent bonding provides the stacked GO layers with the necessary stability to overcome their inherent tendency to disperse in water and also fine-tune the charge, functionality, and spacing of the GO nanosheets. The second strategy (see FIG. 4B) is to assemble the oppositely charged GO nanosheets and polyelectrolytes to create a stacked membrane bonded by electrostatic forces. Compared with the covalently bonded GO membrane, the electrostatically bonded GO membrane has highly charged surfaces, conveniently adjusted functionality (by varying polyelectrolytes with different functionalities, charge density, and morphology), and possible in-situ regenerability for fouling control.

Figure 5A:
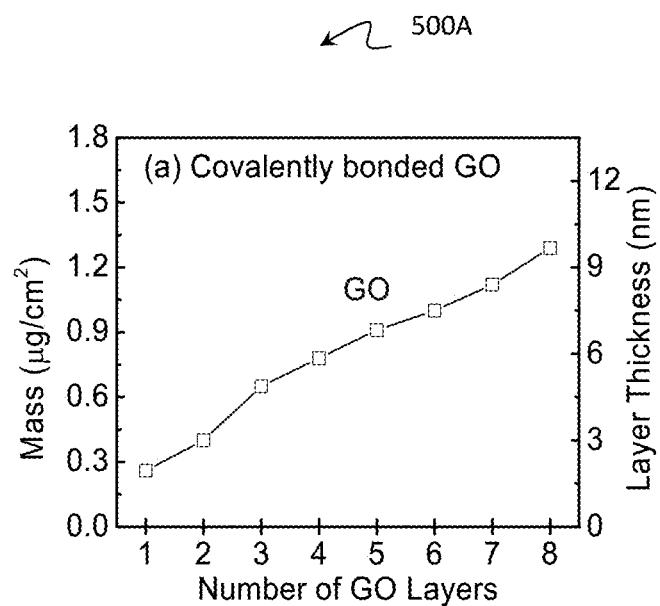
FIG. 5A illustrates a quartz crystal microbalance with dissipation (QCM-D) graph of the covalently bonded GO synthesis strategy of FIG. 4A, in accordance with embodiments of the present disclosure.
Figure 5B:
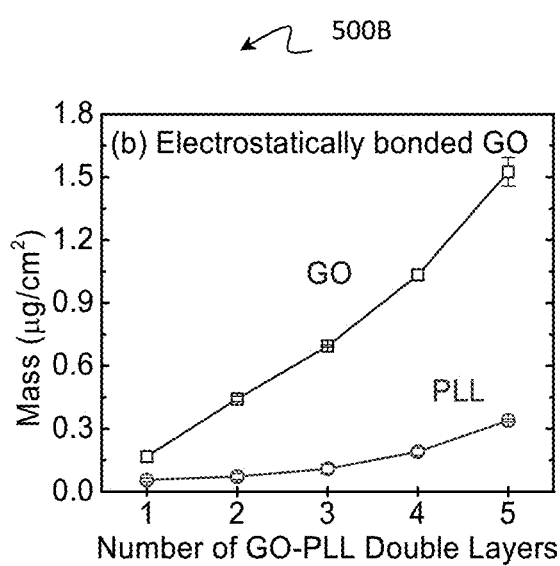
FIG. 5B illustrates a quartz crystal microbalance with dissipation (QCM-D) graph of the electrostatically bonded GO synthesis strategy of FIG. 4B, in accordance with embodiments of the present disclosure.

FIG. 5A illustrates a quartz crystal microbalance with dissipation (QCM-D) graph 500A of the covalently bonded graphene oxide synthesis strategy of FIG. 4A, in accordance with embodiments of the present disclosure, whereas FIG. 5B illustrates a quartz crystal microbalance with dissipation (QCM-D) graph 500B of the electrostatically bonded graphene oxide synthesis strategy of FIG. 4B, in accordance with embodiments of the present disclosure.

The feasibility of using the proposed strategies discussed above with reference to FIGS. 4A and 4B to synthesize GO membranes on a porous polysulfone (PSf) support was examined. Quartz crystal microbalance with dissipation (QCM-D) was used to monitor the formation of the covalently/electrostatically bonded GO membrane on a PSf-coated sensor. The QCM-D is very sensitive with a detection limit of 2 ng/$cm^2$. In the test using the first synthesis strategy, 1,3,5-benzenetricarbonyl trichloride (TMC) was used as a cross-linker. The QCM-D results shown in FIG. 5A indicate that covalently bonded GO layers were successfully deposited on the PSf support. FIG. 5B shows the successful synthesis of an electrostatically bonded GO membrane by the alternate deposition of negatively charged GO and positively charged poly-L-lysine (PLL).

The membrane synthesis protocols were optimized to tune the properties of the GO membranes. Specifically, for the covalent bonding strategy, the size of GO nanochannels was adjusted by using cross-linkers with different molecular weights and morphologies, such as monomers (e.g., TMC, ethylenediamine) and polymers (e.g., polyethyleneimine, or PEI, and poly(allylamine hydrochloride), or PAH, with different molecular weights). For the electrostatically bonding strategy, the structure, charge, and functionality of the GO membrane was tuned by using polyelectrolytes (e.g., PLL, PEI, PAH) with various sizes, morphologies, and charge densities.

Figure 6A:
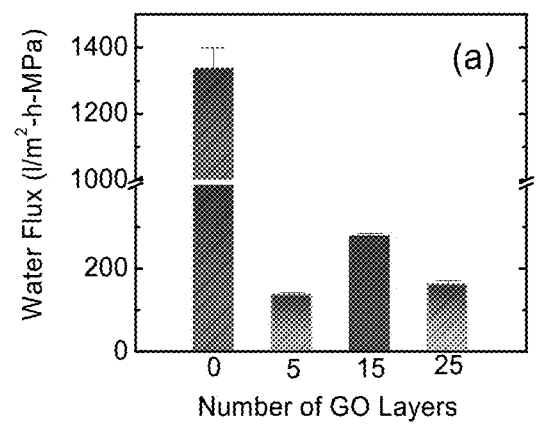
FIG. 6A illustrates a graph of water flux of covalently bonded GO membranes, in accordance with embodiments of the present disclosure.
Figure 6B:
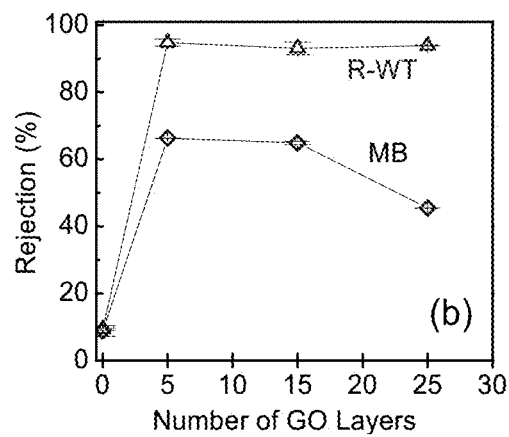
FIG. 6B illustrates a graph of the rejection rate of a first chemical compound when covalently bonded GO membranes are used, in accordance with embodiments of the present disclosure.
Figure 6C:
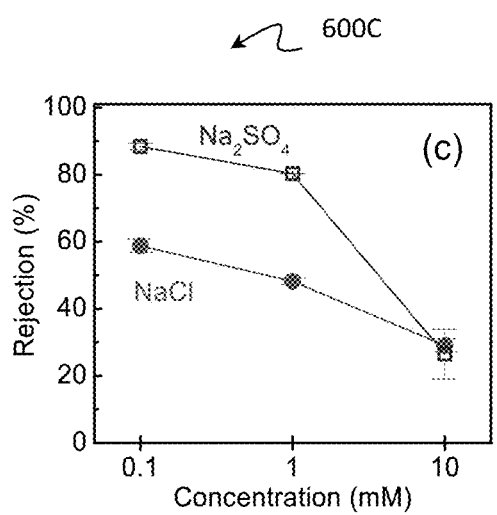
FIG. 6C illustrates a graph of the rejection rate of a second chemical compound when covalently bonded GO membranes, in accordance with embodiments of the present disclosure.

FIG. 6A illustrates a graph 600A of water flux of covalently bonded graphene oxide membranes, in accordance with embodiments of the present disclosure. FIG. 6B illustrates a graph 600B of the rejection rate of a first chemical compound (first contaminant) when covalently bonded graphene oxide membranes are used, in accordance with embodiments of the present disclosure, whereas FIG. 6C illustrates a graph 600C of the rejection rate of a second chemical compound (second contaminant) when covalently bonded graphene oxide membranes, in accordance with embodiments of the present disclosure.

Although simulation studies and water vapor experiments have indicated that GO membranes hold great potential for achieving extremely fast water flux, to our best knowledge, this phenomenon has not been experimentally proven in aqueous phase applications. Therefore, the exemplary embodiments of the present disclosure develop the theoretical basis for water flow within the GO membrane and, subsequently, to optimize membrane properties for improved water permeability.

The water flux of covalently bonded GO membranes was tested. As shown in FIG. 6A, water flux of membranes with 5 to 25 GO layers was in the range of 130-280 LMH/MPa, 5 to 10 times that of most existing polymeric membranes with a similar separation capability. It is interesting to recognize an apparent lack of correlation between water flux and the number of GO layers, indicating that the water resistance of GO coating may not be linearly correlated with the total thickness of the GO layers of a GO membrane. Note that this observation is consistent with the flux behavior of CNT membranes, whose water permeability is not significantly affected by the membrane thickness.

To understand the underlying mechanisms for water transport in GO membranes, the effects of interlayer spacing, charge, and functionality on water flux in covalently/electrostatically bonded GO membranes needs to be considered.

The following discussion provides a clear insight into the mechanisms for the removal of different contaminants by GO membranes. Such knowledge aids to rationally and systematically optimize the membrane selectivity. As plotted in FIG. 6B, the results of rejection tests using covalently bonded GO membranes show that membranes made of 5 to 25 GO layers achieved 46-66% rejection of methylene-blue (MB) and 93-95% rejection of rhodamine-WT (R-WT). The higher rejection rate for R-WT could be attributed to both size exclusion and charge effects. For example, R-WT has a higher molecular weight than MB, and both R-WT and the GO membrane are negatively charged while MB is positively charged.

To better understand the influence of charge on the separation performance of a GO membrane, an investigation was conducted regarding the rejection of NaCl and $Na_2SO_4$ at different solution concentrations. As shown in FIG. 6C, the rejection decreases significantly as ionic strength (i.e., concentration) increases. Note that the Debye length also decreases with increasing ionic strength (e.g., 31 nm for 0.1 mM NaCl, 3 nm for 10 mM NaCl). The trends demonstrated that, as the Debye length decreases, the electrostatic repulsion between ions and the charged membrane decreases due to the suppression of electrostatic double layers, thereby causing the rejection rate to drop. Therefore, charge effects could significantly contribute to the separation mechanisms of a GO membrane. Note also that the rejection rate of the GO membrane is comparable to that of a CNT membrane with sub-2-nm sized pores, indicating that the spacing between GO nanosheets are around or less than 2 nm.

Figure 7:
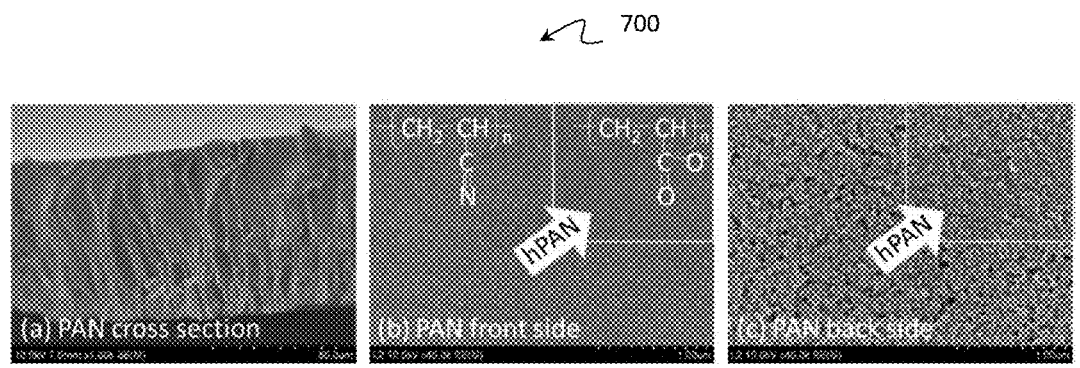
FIG. 7 illustrates a cross-sectional image of the polyacrylonitrile (PAN) support, with front and back views, in accordance with embodiments of the present disclosure.

FIG. 7 illustrates a cross-sectional image 700 of the polyacrylonitrile (PAN) support, with front and back views, in accordance with embodiments of the present disclosure.

Regarding the membrane support preparation, the membrane support substrate was made of polyacrylonitrile (PAN) through phase inversion and partial hydrolysis. First, a PAN solution was prepared by dissolving 18 g PAN (Mw≈150,000) and 2 g LiCl in 80 g N,N-dimethylformamide (DMF) (≥99.8%) at 60° C. All the chemicals were obtained from Sigma-Aldrich (St. Louis, Mo.). After cooling to room temperature, the PAN solution was stored overnight in a vacuum desiccator. Next, the PAN solution was cast on a clean glass plate using an aluminum casting rod with a gate height of 125 µm. Then, the glass plate along with the cast PAN film was immediately soaked in a DI water bath for 10 min, during which phase inversion took place to form the PAN support, which finally underwent partial hydrolysis in 1.5 M NaOH for 1.5 h at 45° C. and was thoroughly rinsed with DI water.

Regarding the GO membrane synthesis, the GO membrane was synthesized via the LbL assembly of GO and PAH on the hydrolyzed PAN (hPAN) support substrate. The GO solution (1 g/L, pH 4) was prepared using the modified Hummers method. The PAH solution was prepared by dissolving 1 g/L PAH (Sigma-Aldrich, St. Louis, Mo.) in DI water and the pH was adjusted from 4.6 to 4 using HCl and NaOH solutions. To synthesize the GO membrane, a typical assembly cycle involved soaking the hPAN support in the PAH solution for 30 min and then in the GO solution for another 30 min, thereby adding one GO-PAH bilayer onto each side of the hPAN support. Repeating a prescribed number of such soaking cycles led to a GO membrane with a desired number of GO-PAH bilayers on each side of the hPAN support. The GO membrane was thoroughly rinsed with DI water between successive soaking treatments during the synthesis.

Regarding the membrane characterization and performance evaluation, membranes were characterized using various techniques and tested under hydraulic pressure, as well as in FO and PRO modes.

Regarding the quantification of the LbL assembly, quartz crystal microbalance with dissipation (QCM-D) (E-4, Biolin Scientific, Linthicum Heights, Md.) was used to monitor the process of assembling GO-PAH bilayers on an hPAN film. In summary, a QCM-D gold sensor (14 mm in diameter) was coated with a PAN film, hydrolyzed in 1.5 M NaOH solution, and mounted in a QCM-D chamber, along with a control bare sensor mounted in another chamber. Both sensors were successively exposed to PAH (1 g/L, pH 4) and GO (1 g/L, pH 4) solutions to mimic the LbL assembly of a GO membrane. The mass of GO or PAH deposited on a sensor was quantified by monitoring and model-fitting the changes in frequency and dissipation, respectively, of the sensor against time using Q-Tool software (Biolin Scientific, Linthicum Heights, Md.).

Regarding the quantification of charge density and partition coefficient, QCM-D can be effectively used to characterize the charge density of a thin film using, for example, CsCl as a probing species. Therefore, QCM-D was used to measure the charge densities of the PAN and hPAN supports, as well as the GO membrane. Note that, after the charge probing of the GO membrane, the sensors were exposed to 1 M $MgCl_2$, 0.25 M trisodium citrate (TSC), and 1 M sucrose solutions, respectively, to study the partition of each type of draw solute into the GO membrane.

Regarding preparation of the membrane support, due to the convenience in manipulating its structure and functional groups, PAN was selected to fabricate the membrane support via phase inversion. FIG. 7 shows the cross-section of the PAN support, which was relatively thin (~60 µm) and contained finger-like structures with low tortuosity. There were dense skin layers on both sides of the support, with one side (referred to as the front side, see middle section of FIG. 7) even denser and smoother than the other side (referred to as the back side, see right section of FIG. 7). Such dense skin layers are ideal for effectively forming a dense barrier layer with much less imperfection on each side of the support.

Figure 8:
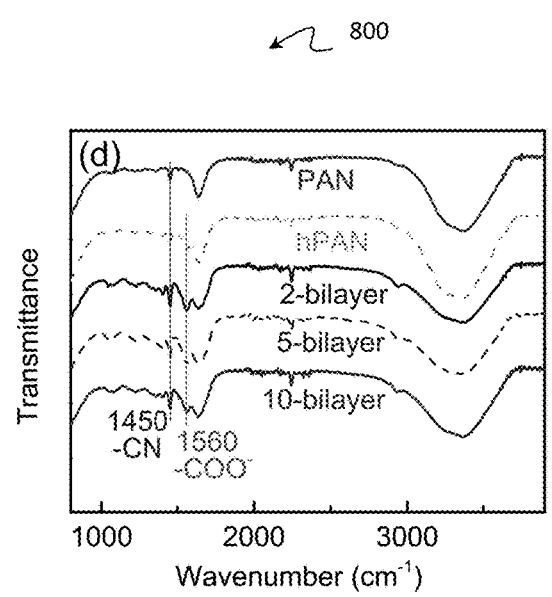
FIG. 8 illustrates a graph of the Fourier Transform Infrared Spectroscopy (FTIR) spectra of the GO membrane, in accordance with embodiments of the present disclosure.

FIG. 8 illustrates a graph 800 of the Fourier Transform Infrared Spectroscopy (FTIR) spectra of the membrane, in accordance with embodiments of the present disclosure.

PAN was partially hydrolyzed to turn into hPAN, such that a portion of nitrile functional groups (—C≡N) were converted to carboxylate functional groups (—COO$^-$), which were required for the membrane support to securely attach the first PAH layer. As revealed by the FTIR spectra in FIG. 8, both PAN and hPAN spectra have a signature peak at 1450 cm$^{-1}$ for nitrile, while partial hydrolysis led to a small new peak in the hPAN spectra at 1560 cm$^{-1}$, confirming the formation of carboxylate functional groups.

Figure 9:
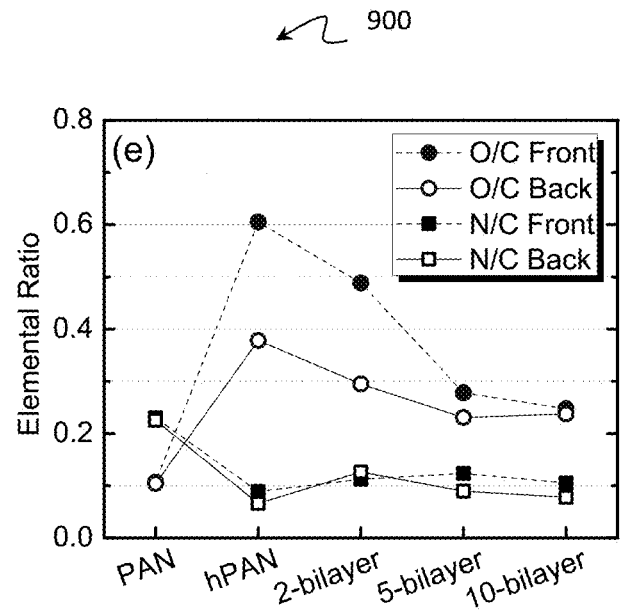
FIG. 9 illustrates a graph of the elemental ratios of membrane supports and GO membranes by XPS analysis, in accordance with embodiments of the present disclosure.

FIG. 9 illustrates a graph 900 of elemental ratios of membrane supports and GO membranes by XPS analysis, in accordance with embodiments of the present disclosure.

The replacement of nitrile by carboxylate was also verified by the decreased N/C ratio and the increased O/C ratio. In addition, the O/C ratio for the front side (i.e., the side with smaller pores) of hPAN is much higher than that on its back side, possibly because the degree of hydrolysis on the exposed surface was much larger than inside the support and because the penetration depth of XPS on the back side was higher due to the looser structure there. Note that the partial hydrolysis of PAN did not cause observable changes in the cross-sectional structure but slightly narrowed the surface pores of the membrane support, as shown in the boxed areas of FIG. 7 (middle and right sections). The relatively small pore sizes and smooth surface made hPAN an ideal substrate for the LbL assembly.

Figure 10:
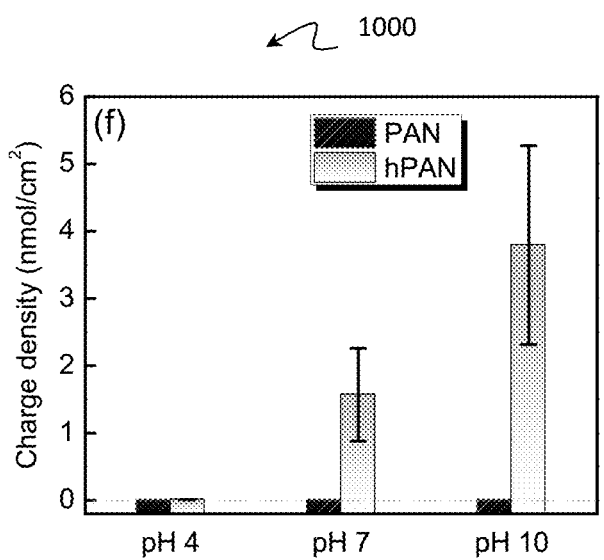
FIG. 10 illustrates a graph of charge density of membrane supports by QCM-D, in accordance with embodiments of the present disclosure.

FIG. 10 illustrates a graph 1000 of charge density of membrane supports by QCM-D, in accordance with embodiments of the present disclosure.

Concerning the properties of the membrane support, GO, and PAH, the charges of PAN and hPAN were probed by Cs$^+$ in QCM-D experiments. As demonstrated in FIG. 10, the PAN support did not carry any detectable charge at any studied pH. In contrast, the hPAN support contained significant negative charges at pHs 7 and 10 but very low charges at pH 4, confirming the successful conversion of nitrile to carboxylate functional groups, which have a pKa of ~4. Despite the low charge density at pH 4, the first PAH layer was successfully assembled on the hPAN support, indicating that interactions (e.g., hydrophobic force, hydrogen bonding) besides electrostatic interaction also played a role in the deposition of the first PAH layer.

Figure 11:
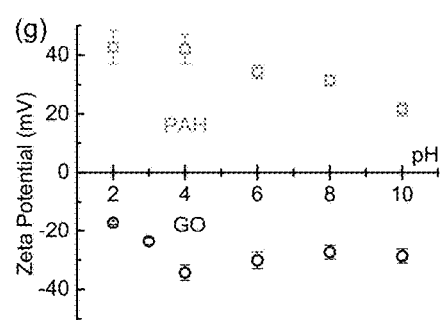
FIG. 11 illustrates a graph of zeta potentials of GO and poly(allylamine hydrochloride) (PAH) at different pHs, in accordance with embodiments of the present disclosure.

FIG. 11 illustrates a graph 1100 of zeta potentials of GO and PAH at different pHs, in accordance with embodiments of the present disclosure.

The charge properties of GO and PAH were analyzed using zeta potential measurement to evaluate the feasibility of the LbL assembly of GO-PAH bilayers via electrostatic interaction. As shown in FIG. 11, GO and PAH were able to remain positively and negatively charged, respectively, over a wide pH range of 2 to 10, thereby ensuring the stability of the electrostatically assembled GO-PAH bilayers and eventually the GO membrane.

Figure 12:
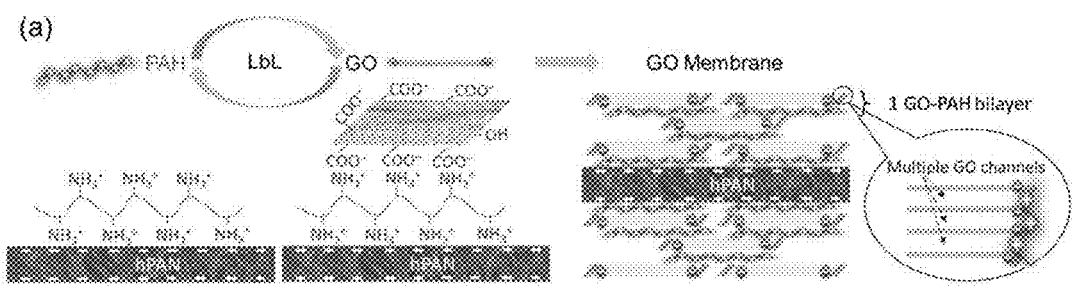
FIG. 12 illustrates a schematic diagram of an LbL assembly of a GO membrane by alternately soaking an hPAN support substrate in 1 g/L PAH (pH 4) solution and 1 g/L GO solution (pH 4), in accordance with embodiments of the present disclosure.

FIG. 12 illustrates a schematic diagram 1200 of an LbL assembly of a GO membrane by alternately soaking an hPAN support substrate in 1 g/L PAH (pH 4) solution and 1 g/L GO solution (pH 4), in accordance with embodiments of the present disclosure.

Concerning the synthesis of the GO membrane, the process of LbL assembly of a GO membrane is schematically illustrated in FIG. 12. The hPAN support was first immersed in the PAH solution to attach positively charged PAH, and then in GO solution to deposit negatively charged GO on top of PAH, thus completing the assembly of the first GO-PAH bilayer on each side of the hPAN support. Such a deposition cycle was repeated to assemble a desired number of GO-PAH bilayers. Note that the pHs of both PAH and GO solutions were kept at 4, close to the natural values of the as-prepared solutions. Therefore, significant amount of acid or base was not needed to adjust the solution pH and hence the solution ionic strength was kept to a minimum, thereby avoiding the formation of a loosely packed membrane structure due to the otherwise hydration of polyelectrolytes and also preventing GO nanosheets from aggregation due to the charge screening effect.

Figure 13:
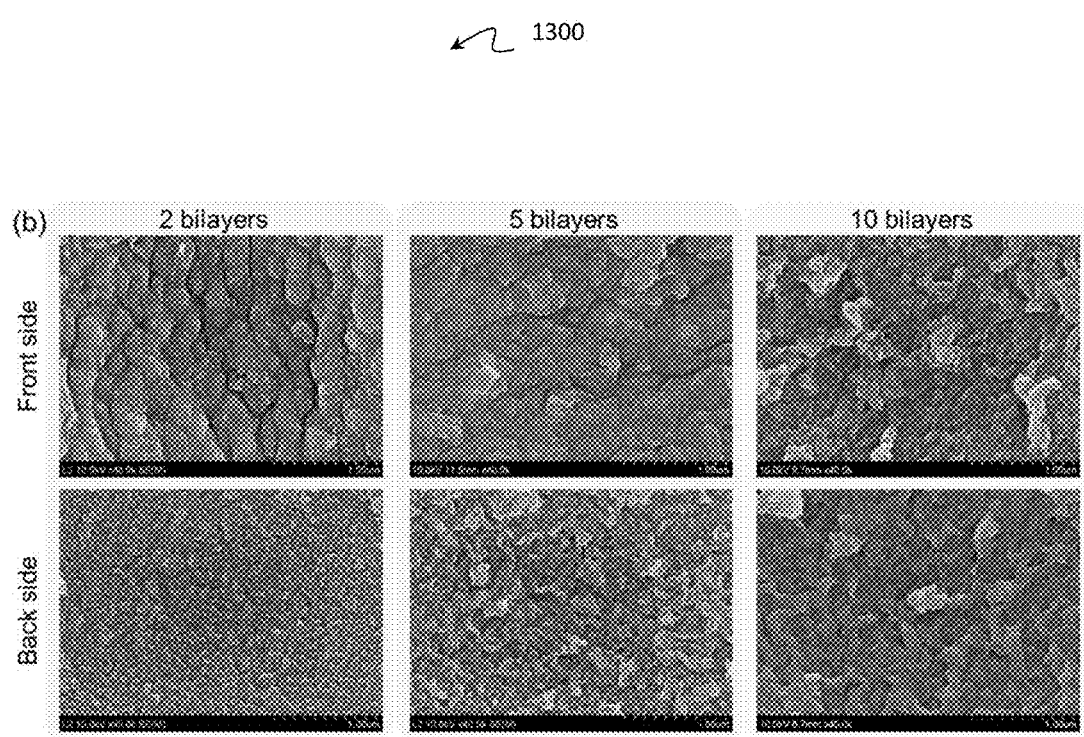
FIG. 13 illustrates SEM images of the GO membranes made of different numbers of GO-PAH bilayers, in accordance with embodiments of the present disclosure.

FIG. 13 illustrates SEM images 1300 of the GO membranes made of different numbers of GO-PAH bilayers, in accordance with embodiments of the present disclosure.

Concerning the characterization of the GO membrane, the SEM images in FIG. 12 clearly show that the two sides of GO membranes were rougher than those of the original hPAN support, respectively, indicating a successful assembly of multiple GO-PAH bilayers. Also note that there existed a significant difference in the surface morphology of the two sides of the original hPAN support but such a difference was reduced as the number of GO-PAH bilayers increased, indicating that a higher surface coverage by GO-PAH was achieved on both sides of the hPAN support.

Additional evidence is available for the successful assembly of GO-PAH bilayers by the LbL procedure. For example, FIG. 9 shows that the O/C ratio gradually decreases with the increasing number of GO-PAH bilayers. In particular, the O/C ratio for both front and back sides of the 10-bilayer GO membrane reaches almost the same value of 0.24, indicating that the two surfaces attained the same level of coverage by GO-PAH. The FTIR spectra in FIG. 8 also reveal that the intensity of the carboxylate groups at 1560 cm$^{-1}$ increased as more GO-PAH bilayers were assembled.

Figure 14:
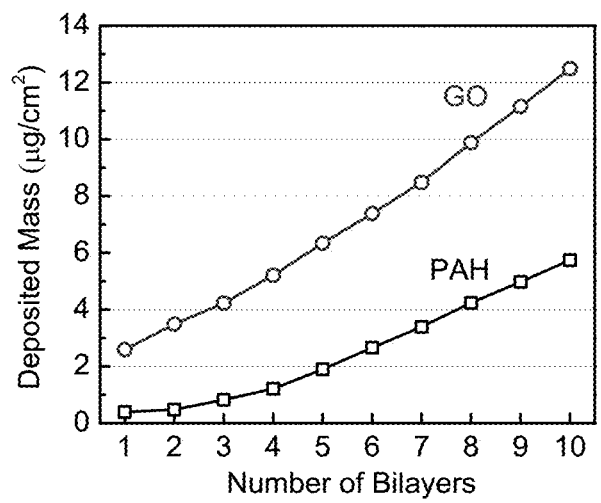
FIG. 14 illustrates a graph of cumulative masses of GO and PAH during the LbL assembly of a GO-PAH film on an hPAN-coated QCM-D sensor, in accordance with embodiments of the present disclosure.

FIG. 14 illustrates a graph 1400 of cumulative masses of GO and PAH during the LbL assembly of a GO-PAH film on an hPAN-coated QCM-D sensor, in accordance with embodiments of the present disclosure.

Regarding the composition and the thickness of the GO membrane, QCM-D was employed to monitor the LbL assembly of GO-PAH bilayers so as to quantify the composition and thickness of the GO membrane. The raw frequency and dissipation data, as well as the derived mass ratios of PAH to GO were used. FIG. 14 clearly shows that the masses of GO and PAH both increased steadily with the increasing number of bilayers, proving the successful assembly of multiple GO-PAH bilayers. It is also observed in FIG. 14 that the mass of GO was consistently greater than (2 to 5 times) that of PAH after any deposition cycle, most likely due to the combined effects of the higher charge density (and thus lower mass/charge ratio) of PAH and the larger lateral dimensions (and thus higher mass/charge ratio) of GO.

The quantified mass of GO and PAH enables the estimation of the total GO-PAH thickness of a GO membrane. For example, the 10-bilayer GO membrane had a total deposited mass of 18.2 µg/cm$^2$ on the hPAN-coated sensor. Assuming a GO membrane density of 1.1 g/cm$^3$, it is estimated that the total GO-PAH thickness on each side of the hPAN support is ~165 nm and hence on average a single GO-PAH bilayer is ~16.5 nm thick, much more than that (~1 nm) of a pure GO layer in previously reported GO membranes, suggesting that multiple GO layers were deposited during each GO-PAH deposition cycle.

The high rejection of sucrose by the GO membrane indicates that the GO channel size (i.e., the clear inter-GO-layer spacing, h) was ~1 nm, further supporting the existence of multiple GO layers within one GO-PAH bilayer. Since the thickness of a single GO nanosheet, $d_0$, is ~0.3 nm, a typical GO layer in the present GO membrane should have an overall thickness of $d=h+d_0=$~1.3 nm, keeping in mind that PAH might be sandwiched as a spacer between GO nanosheets.

Therefore, a total of 16.5/1.3≈13 GO layers may exist in one GO-PAH bilayer. In fact, deposition of multiple GO layers during one assembly cycle is quite reasonable because, compared with PAH, GO has a low charge density and hence multiple GO layers were needed to compensate all charges on PAH. Furthermore, as most charges on GO are located along its edges, it is possible that multiple GO nanosheets, since they might not be deposited perfectly flat but at an angle, partially overlapped as they electrostatically edge-connected themselves to PAH, thereby forming multiple GO layers during one deposition cycle. FIG. 13 illustrates the structure of a GO membrane where multiple GO-layers (and thus multiple inter-GO channels) exist in each GO-PAH bilayer.

Figure 15:
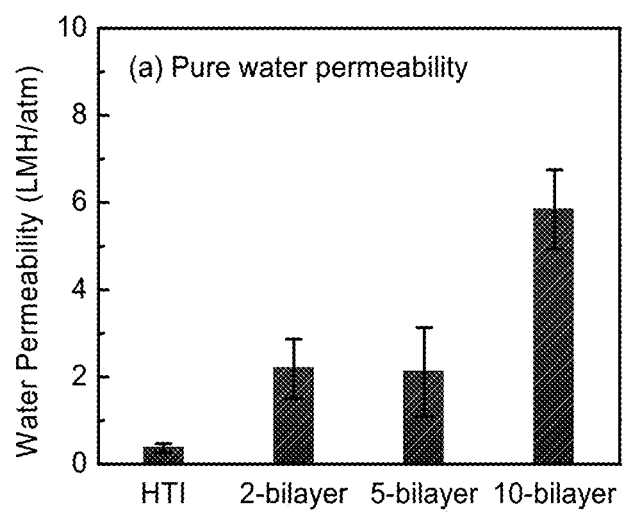
FIG. 15 illustrates a graph of pure water permeability under hydraulic pressure, in accordance with embodiments of the present disclosure.

FIG. 15 illustrates a graph 1500 of pure water permeability under hydraulic pressure, in accordance with embodiments of the present disclosure.

Concerning water transport in GO membranes, the water flux of the GO membrane was measured in a hydraulically pressurized membrane system. As shown in FIG. 15, the water permeability (i.e., water flux normalized by transmembrane pressure) of the GO membranes ranged from 2.1 to 5.8 LMH/atm and was much lower than that of the PAN (88.4 LMH/atm) and hPAN support (19.0 LMH/atm), indicating that the existence of GO-PAH bilayers led to significant hydraulic resistance and hence lowered the water flux.

The 10-bilayer GO membrane is taken as an example to estimate the velocity of water transport within a GO membrane. Assuming on average a GO lateral dimension of 500 nm, clear inter-GO-layer spacing of 1 nm, and single GO-PAH bilayer thickness of 16.5 nm, the water permeability (5.8 LMH/atm) of the GO membrane can be converted to a water transport velocity of $4.8 \times 10^{-4}$ m/s under a 1-atm transmembrane pressure. This estimated velocity turns out to be two orders of magnitude higher than the velocity ($8.4 \times 10^{-7}$ m/s) of water flowing between two hypothetical parallel plates, as predicted by the plate-Poiseuille equation. Hence, an experimental verification of a fast water transport through GO channels in an electrostatically assembled GO membrane is presented. Upon knowing that the sandwiching of certain polymers (e.g., PAH) between GO layers may not necessarily reduce water transport velocity in a layered GO membrane, researchers are encouraged to explore the synthesis of highly tunable GO membranes by using carefully selected polymeric spacers that have exceptional properties.

At the current stage, the water permeability of the GO membrane is one order of magnitude higher than that (0.36±0.11 LMH/atm) of the commercial HTI membrane, as compared in FIG. 15. Note that the GO membrane permeability can be further improved by increasing GO porosity and decreasing its tortuosity, both of which can be achieved by, for example, optimizing GO lateral dimension, creating vertically aligned GO nanosheets (i.e., generating straight-through GO channels), and varying deposition conditions.

Figure 16:
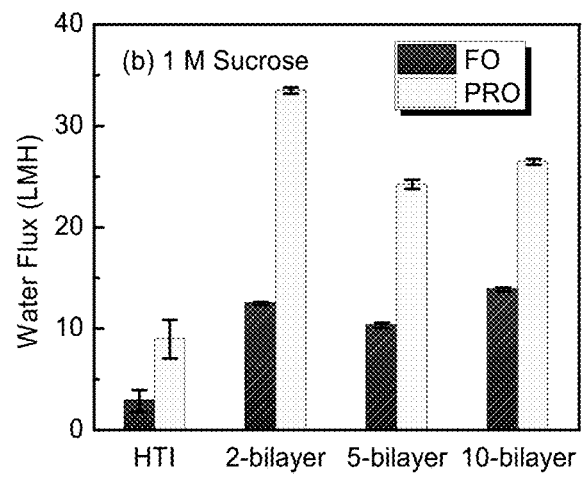
FIG. 16 illustrates a graph of water flux in FO and PRO modes with 1 M sucrose, in accordance with embodiments of the present disclosure.

FIG. 16 illustrates a graph 1600 of water flux in FO and PRO modes with 1 M sucrose, in accordance with embodiments of the present disclosure.

Concerning water flux and GO membrane in FO and PRO, the water flux of the GO membrane was tested in FO and PRO modes using DI water as feed solution and using 1 M sucrose, 1 M $MgCl_2$, and 0.25 M TSC as draw solutions, respectively. FIG. 16 shows that, when sucrose was used as draw solute, the GO membrane flux was about 3 to 4 times that of the HTI membrane in FO and PRO modes, respectively. Note that water flux of the GO membrane in PRO mode was more than twice that in FO mode, indicating the existence of significant internal concentration polarization (ICP) in FO mode. The structural integrity and separation capability of the GO-PAH bilayers deposited on the back side of the hPAN support are less than that on the front side. This hypothesis is consistent with the observation in FIG. 15 that as the number of GO-PAH bilayers increased, the flux difference between FO and PRO modes decreased in general.

Figure 17:
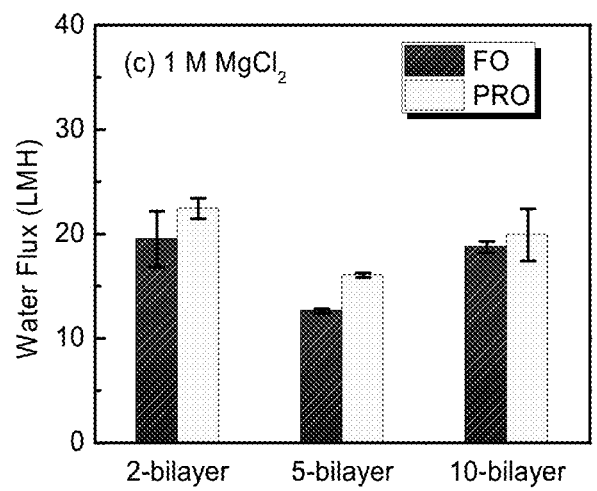
FIG. 17 illustrates a graph of water flux in FO and PRO modes with 1 M $MgCl_2$, in accordance with embodiments of the present disclosure.
Figure 18:
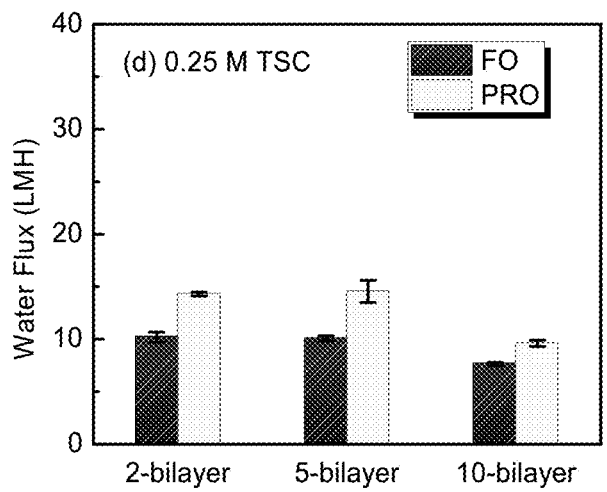
FIG. 18 illustrates a graph of water flux in FO and PRO modes with 0.25 M TSC, in accordance with embodiments of the present disclosure.

FIG. 17 illustrates a graph 1700 of water flux in FO and PRO modes with 1 M $MgCl_2$, in accordance with embodiments of the present disclosure, whereas FIG. 18 illustrates a graph 1800 of water flux in FO and PRO modes with 0.25 M TSC, in accordance with embodiments of the present disclosure.

It is observed in FIGS. 17 and 18 that water fluxes of a GO membrane in FO and PRO modes were very similar when using $MgCl_2$ or TSC as draw solute, indicating that internal concentration polarization (ICP) would simultaneously exist or be absent in FO and PRO modes. The ion ($MgCl_2$ and TSC) transport flux of a GO membrane was relatively high, indicating that the GO-PAH bilayers unlikely created a barrier that blocked the ions from entering the hPAN support. Therefore, it is reasonable to believe that ICP was present in both FO and PRO modes for the case of $MgCl_2$ or TSC as draw solute. In fact, it has been demonstrated that polyelectrolyte films can significantly hydrate and expand their thickness under high ionic strength. As a result, regardless of the direction that a GO membrane was placed in the test system (i.e., use of the membrane in FO vs. PRO mode), the GO-PAH bilayers in contact with the high-concentration draw solution would hydrate and lead to a loose structure, which allowed ions to transport and hence resulted in ICP in the membrane support.

Figure 19:
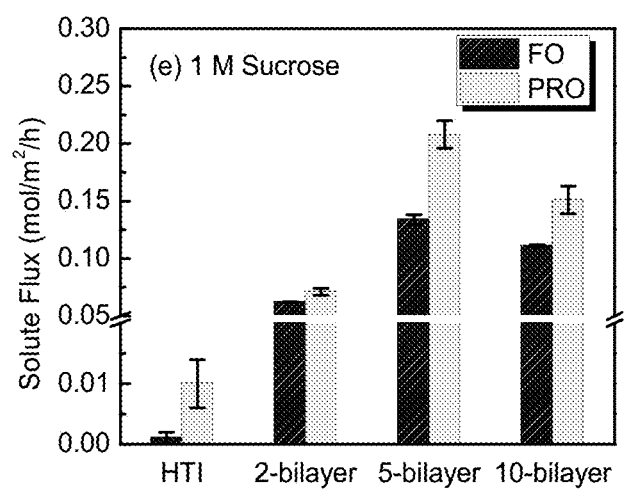
FIG. 19 illustrates a graph of sucrose permeation flux, in accordance with embodiments of the present disclosure.

FIG. 19 illustrates a graph 1900 of sucrose permeation flux, in accordance with embodiments of the present disclosure.

Concerning the mechanisms of solute transport in GO membranes, the solute flux in FO, as well as in PRO mode was measured. FIG. 19 shows that the sucrose flux of a GO membrane was more than 7 times that of an HTI membrane. However, there seems no conclusive correlation between the number of bilayers and the solute flux of a GO membrane. Note that the sucrose flux of a GO membrane in FO mode was consistently lower than that in PRO mode. This is because typically the ICP in FO mode caused the dilution of draw solution in the membrane support, thereby minimizing the passage of solutes through the membrane.

Information on solute rejection of the GO membrane can be used to estimate its pore cutoff size. The 10-bilayer GO membrane exhibited much higher rejection of sucrose (99%) than that of $MgCl_2$ (78%) and TSC (90%), indicating that the channel cutoff size (i.e., the inter-GO-layer spacing) of the GO membrane was close to the hydrated diameter of sucrose (~1 nm). The relatively low rejection of ionic species can be most likely attributed to the hydration effect of the GO-PAH film under high ionic strength. Therefore, the GO membrane at the current stage may not be directly applicable for desalination, because without covalent cross-linking, the GO membrane would probably swell under high ionic strength and thus considerably lose its solute rejection capability. Nevertheless, the present GO membrane can be well suited for many important applications such as FO-based emergency water supply systems that use sugary draw solutions as well as water purification and wastewater reuse that do not mandate high ionic strength conditions.

In order to determine the mechanisms controlling the solute transport in the GO membrane, the partition coefficients and diffusion coefficients were characterized for the three draw solutes. Partition coefficients of the three solutes were between 2.4 and 3.0 (so they do not differ significantly), indicating that partitioning of these solutes into the GO membrane was neither affected by the size or charge of the specific solute nor a governing factor for the huge difference in the permeation of these solutes.

Figure 20:
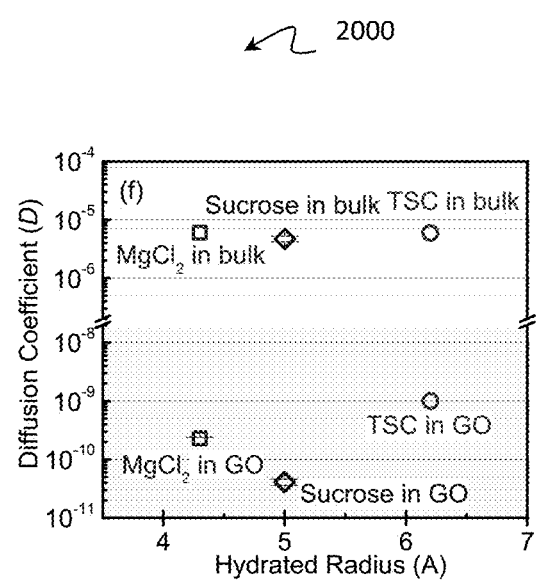
FIG. 20 illustrates a graph of diffusion coefficients of draw solutes for the 10-bilayer GO membrane, compared with those for water, in accordance with embodiments of the present disclosure.

FIG. 20 illustrates a graph 2000 of diffusion coefficients of draw solutes for the 10-bilayer GO membrane, compared with those for water, in accordance with embodiments of the present disclosure.

As plotted in FIG. 20, the diffusion coefficients of $MgCl_2$ ($4.2\times10^{-6}$ cm$^2$/s), TSC ($2.6\times10^{-6}$ cm$^2$/s), and sucrose (4.3 to $5.2\times10^{-6}$ cm$^2$/s) are similar in bulk water. Their diffusion coefficients for the GO membrane, however, are 3 to 5 orders of magnitude lower. The hindering effect is the most pronounced for sucrose, with the lowest diffusion coefficient of $4.1\times10^{-11}$ cm$^2$/s. The ring structure in sucrose may have strong interactions with the carbon rings in GO, thereby increasing the hindrance by friction and decreasing the diffusion of sucrose. The much lower hindering effects for the two ionic species ($MgCl_2$ and TSC) again can be attributed to the hydration of GO-PAH films under high ionic strength.

A closer comparison of the two ionic species ($MgCl_2$ and TSC) helps identify the most possible solute transport path in the GO membrane. Since TSC is composed of one $C_6H_5O_7^{3-}$ and three $Na^+$, the diffusion of $C_6H_5O_7^{3-}$ should be faster than TSC and thus more than 25 times that of sucrose, although the hydrated radius of $C_6H_5O_7^{3-}$ is even slightly higher than that of sucrose. The increase in the transport rate of negative ions indicates that the dominant path for solute transport was negatively charged, since a positively charged path would tend to adsorb negative ions onto its surface and thereby increase the ion-surface friction and consequently decrease the diffusion rate. This indication is further reinforced by the fact that the diffusion coefficient of $MgCl_2$ (controlled by $Mg^{2+}$) is only one fourth that of TSC, although $MgCl_2$ diffuses faster than TSC in bulk water. Therefore, the dominant transport path in the GO membrane should be that formed by the negatively charged GO nanosheets instead of positively charged PAH polymers. This conclusion is consistent with the foregoing observation that the existence of PAH did not interfere with the fast water transport in GO channels, indicating that most likely PAH connected GO nanosheets only at their edges while leaving their surface areas largely untouched.

In summary, the exemplary embodiments of the present disclosure relate to a unique 2D structure of GO that makes it ideal for synthesizing a new class of membrane by stacking GO nanosheets via a layer-by-layer (LbL) assembly technique, which is relatively cost-effective and environmentally friendly because all fabrication steps can be performed in aqueous solutions while traditional membrane synthesis procedures (e.g., interfacial polymerization) often involve complex chemical reactions and use organic solvents.

In the exemplary embodiments of the present disclosure, potential use of layered graphene oxide (GO) membrane in forward osmosis (FO) and pressure retarded osmosis (PRO) processes is contemplated. As an energy-inexpensive alternative to the conventional pressure-driven membrane processes, the FO/PRO membrane technology has experienced an accelerated development over the past decade. In contrast to other types of water purification membranes, FO/PRO membranes must have a relatively thin, hydrophilic support in order to reduce internal concentration polarization, which is caused by the hindered solute transport within the support layer and can significantly reduce membrane flux and aggravate membrane fouling. To date, the existing commercial FO/PRO membranes can be categorized into cellulose-based membranes and thin-film composite (TFC) membranes. Synthesized via phase separation, cellulose-based membranes have excellent antifouling properties but exhibit relatively low water flux and high salt passage and only work within a narrow pH range. In comparison, TFC membranes show excellent salt rejection at the cost of low pure water flux due to the thick, dense membrane support. Therefore, development of high-performance FO/PRO membranes has been a major task in the journey of achieving the full benefit of such a sustainable technology.

In the exemplary embodiments of the present disclosure, it is proposed to electrostatically bond layered GO nanosheets to form a stable GO membrane and test its suitability for FO/PRO processes. The LbL technique was employed to assemble oppositely charged GO and poly (allylamine hydrochloride) (PAH) layers on both sides of a charged support substrate. The synthesized GO membrane was characterized using a series of techniques to confirm the successful assembly of multiple GO-PAH bilayers, quantify their composition and thickness, and understand the structure and charge properties of the GO membrane. The GO membrane was then tested in cross-flow pressurized and also in FO/PRO membrane systems in order to understand the mechanisms of the transport of water and solutes within the GO membrane, using a commercially available FO membrane as a baseline.

The facile/scalable synthesis and surface modification, exceptional properties, and fundamental mechanisms of the novel graphene-oxide-enabled membranes may transform the development of a next generation of high-performance, energy-efficient, low-cost membranes, which also have various important applications including: (1) point-of-use water purification for military operation missions and for humanitarian relief to disaster-ridden and impoverished areas; (2) on-site treatment of hydrofracking flowback water; (3) renewable energy production; and (4) drug delivery and artificial organ development. Introduction of the new membrane technology will add a significant driving force to the economy. Therefore, potential environmental, economic, and social benefits can be enormous.

Persons skilled in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure.

The foregoing examples illustrate various aspects of the present disclosure and practice of the methods of the present disclosure. The examples are not intended to provide an exhaustive description of the many different embodiments of the present disclosure. Thus, although the foregoing present disclosure has been described in some detail by way of illustration and example for purposes of clarity and understanding, those of ordinary skill in the art will realize readily that many changes and modifications may be made thereto without departing form the spirit or scope of the present disclosure.

While several embodiments of the disclosure have been shown in the drawings and described in detail hereinabove, it is not intended that the disclosure be limited thereto, as it is intended that the disclosure be as broad in scope as the art will allow. Therefore, the above description and appended drawings should not be construed as limiting, but merely as exemplifications of particular embodiments. Those skilled in the art will envision other modifications within the scope and spirit of the claims appended hereto.

What is claimed is:

1. A method for creating a water separation membrane, the method comprising:
   depositing a plurality of graphene oxide (GO) nanosheets via a layer-by-layer assembly;
   bonding the plurality of GO nanosheets with each other and with a support substrate; and
   cross-linking the plurality of GO nanosheets by 1,3,5-benzenetricarbonyl trichloride on the support substrate.

2. The method of claim 1, further comprising covalently bonding the plurality of GO nanosheets via cross-linkers.

3. The method of claim 1, wherein the cross-linkers are monomers and polymers.

4. The method of claim 1, further comprising electrostatically bonding the plurality of GO nanosheets.

5. The method of claim 4, wherein a structure, a charge, and a functionality of the plurality of GO nanosheets is tuned by using polyelectrolytes.

6. The method of claim 1, wherein the support substrate is a polydopamine coated polysulfone support substrate.

7. The method of claim 1, wherein the plurality of GO nanosheets are negatively charged.

8. The method of claim 1, further comprising forming a plurality of nanochannels between the plurality of GO nanosheets for allowing the flow of a fluid and for rejecting the flow of contaminants.

9. A method for creating a water separation membrane, the method comprising:
   depositing a plurality of graphene oxide (GO) nanosheets via a layer-by-layer assembly;
   electrostatically bonding the plurality of GO nanosheets with each other and with a support substrate; and
   tuning a structure, a charge and functionality of the plurality of GO nanosheets by using electrolytes.

10. The method of claim 9, wherein the support substrate is a polydopamine coated polysulfone support substrate.

11. The method of claim 9, further comprising covalently bonding the plurality of GO nanosheets via cross-linkers.

12. The method of claim 11, wherein the cross-linkers are monomers and polymers.

13. The method of claim 9, further comprising cross-linking the plurality of GO nanosheets by 1,3,5-benzenetricarbonyl trichloride on the support substrate.

14. The method of claim 9, wherein the plurality of GO nanosheets are negatively charged.

15. The method of claim 9, further comprising forming a plurality of nanochannels between the plurality of GO nanosheets for allowing the flow of a fluid and for rejecting the flow of contaminants.

* * * * *